United States Patent
Mosley

(10) Patent No.: US 8,215,095 B2
(45) Date of Patent: Jul. 10, 2012

(54) MODEL-BASED COORDINATED AIR-FUEL CONTROL FOR A GAS TURBINE

(75) Inventor: Matthew John Mosley, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 432 days.

(21) Appl. No.: 12/605,599

(22) Filed: Oct. 26, 2009

(65) Prior Publication Data

US 2011/0094238 A1 Apr. 28, 2011

(51) Int. Cl.
*F02C 9/00* (2006.01)
*F02K 3/00* (2006.01)

(52) U.S. Cl. ............... 60/39.27; 60/240; 60/773

(58) Field of Classification Search ........... 60/39.27, 60/39.24, 39.281, 790, 773, 764, 243, 240, 60/239, 238, 237, 235, 233
See application file for complete search history.

(56) References Cited

U.S. PATENT DOCUMENTS

| 4,550,565 A | 11/1985 | Ozono |
| 5,487,265 A | 1/1996 | Rajamani et al. |
| 5,636,507 A | 6/1997 | Rajamani et al. |
| 5,896,736 A | 4/1999 | Rajamani |

OTHER PUBLICATIONS

Great Britain Search Report issued in connection with GB Application No. GB1017407.6, Feb. 7, 2011.

*Primary Examiner* — Ehud Gartenberg
*Assistant Examiner* — Gerald Sung
(74) *Attorney, Agent, or Firm* — Pearne & Gordon LLP

(57) ABSTRACT

A fuel controller, and associated method, provides a fuel control output signal to a fuel control actuator to control operations. The fuel controller determines the fuel control output signal based on rotational speed error. A combustion air controller provides a combustion air control output signal to a combustion air control actuator to control operations. A cross channel controller is in communication with the fuel controller and the combustion air controller. The cross channel controller provides a combustion air control modification signal to the combustion air controller. The combustion air control modification signal is determined from the fuel control output signal using an air versus fuel model. The combustion air controller determines a preliminary combustion air control signal based on an exhaust temperature error, and further determines the combustion air control output signal based on both of the preliminary combustion air control signal and the combustion air control modification signal.

10 Claims, 2 Drawing Sheets

MODEL-BASED COORDINATED AIR-FUEL CONTROL FOR A GAS TURBINE

BACKGROUND OF THE INVENTION

1. Field of the Invention

The present invention relates to control systems for gas turbines, and in particular to a control system having both a fuel controller and a combustion air controller.

2. Description of Prior Art

Gas turbines are commonly coupled to electric generators to drive the generator. It is known to control the amount of fuel and air supplied to a combustion chamber of the gas turbine using a cross channel controller. Known cross channel controllers operate on a turbine speed error signal that is an input to a fuel supply controller. Such cross channel controllers process the speed error signal, and the resulting processed speed error signal is added to a turbine exhaust temperature error signal. The sum of the turbine exhaust temperature error signal and processed speed error signal is processed by an air supply controller using a transfer function, to generate a control signal that controls air supplied to the combustion chamber. See, for example, U.S. Pat. Nos. 5,487,265 (Jan. 30, 1996) and 5,636,507 (Jun. 10, 1997).

BRIEF DESCRIPTION OF THE INVENTION

In accordance with one aspect the present invention provides a control system for a gas turbine. The control system includes a fuel control actuator and a combustion air control actuator. A speed sensor senses a rotational speed of the gas turbine. A temperature sensor senses exhaust temperature of the gas turbine. A coordinated air-fuel controller controls operations of the fuel control actuator and the combustion air control actuator. The coordinated air-fuel controller receives a first input signal from the speed sensor and a second input signal from the temperature sensor. A rotational speed error calculator determines a rotational speed error based on the first input signal from the speed sensor and a speed reference. An exhaust temperature error calculator determines an exhaust temperature error based on the second input signal from the temperature sensor and a temperature reference. A fuel controller provides a fuel control output signal to the fuel control actuator to control operations of the fuel control actuator. The fuel controller determines the fuel control output signal based on the rotational speed error. A combustion air controller provides a combustion air control output signal to the combustion air control actuator to control operations of the combustion air control actuator. A cross channel controller is in communication with the fuel controller and the combustion air controller. The cross channel controller provides a combustion air control modification signal to the combustion air controller. The cross channel controller determines the combustion air control modification signal from the fuel control output signal using an air versus fuel model. The combustion air controller determines a preliminary combustion air control signal based on the exhaust temperature error, and further determines the combustion air control output signal based on both of the preliminary combustion air control signal and the combustion air control modification signal.

In accordance with another aspect the present invention provides a method of controlling air supply and fuel supply in a gas turbine. A rotational speed of the gas turbine is determined. A rotational speed error is generated by comparing the rotational speed of the gas turbine to a speed reference. A fuel control output signal is generated corresponding to the rotational speed error. The fuel control output signal is provided to a fuel control actuator. The fuel control actuator adjusts a fuel flow based on the fuel control output signal. A cross channel controller including an air versus fuel model is provided. From the fuel control output signal, the cross channel controller generates a combustion air control modification signal using the air versus fuel model. An exhaust temperature of exhaust gas of the gas turbine is determined. An exhaust temperature error is generated by comparing the exhaust temperature to a temperature reference. A preliminary combustion air control signal is generated corresponding to the exhaust temperature error. The preliminary combustion air control signal and the combustion air control modification signal are combined to generate a combustion air control output signal. The combustion air control output signal is provided to a combustion air control actuator. The combustion air control actuator adjusts an amount of combustion air based on the combustion air control output signal.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
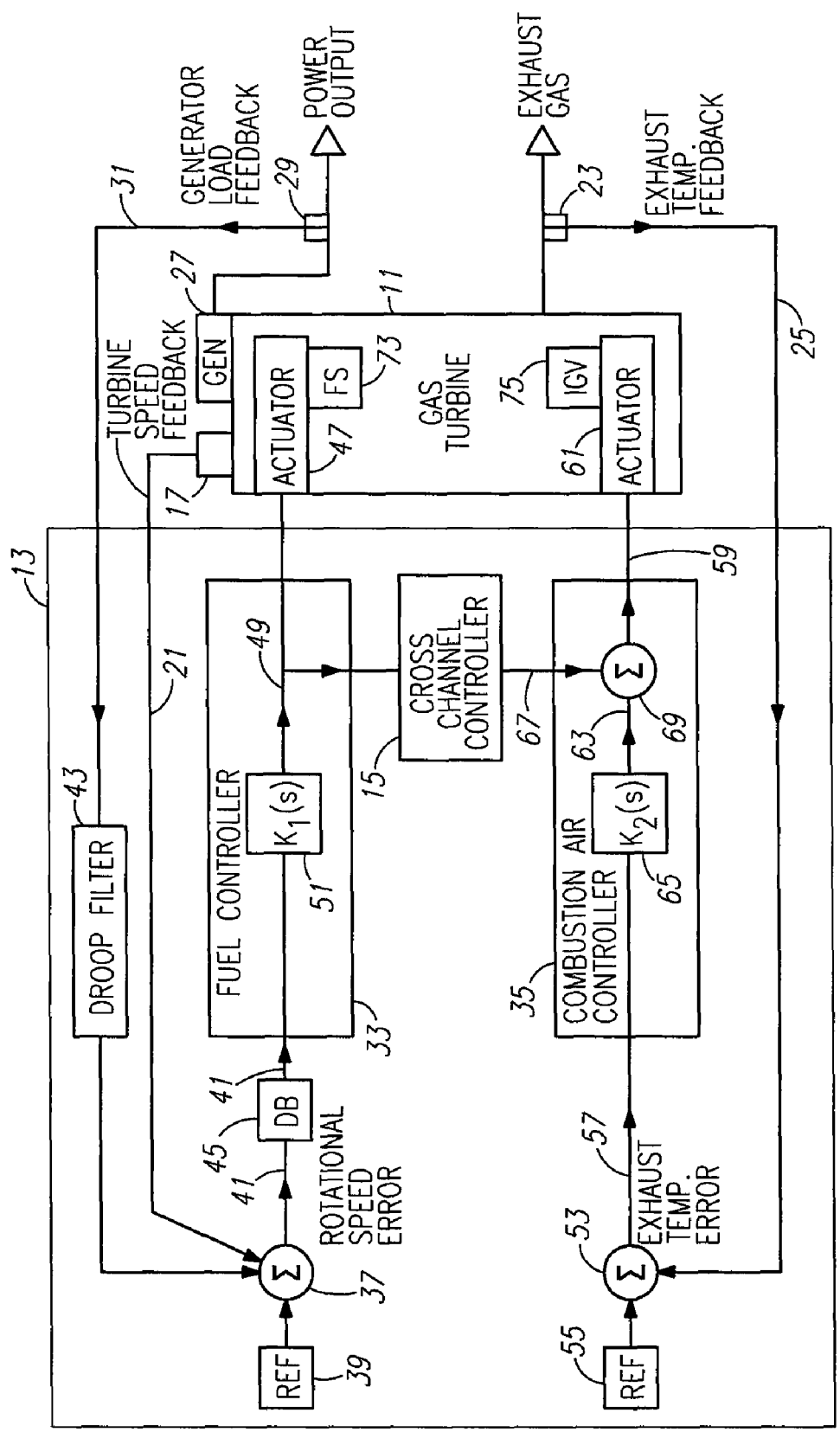
FIG. 1 is a schematic diagram of a gas turbine and a control system for the gas turbine.

Features and aspects of the present invention will now be described more fully hereinafter with reference to the accompanying drawings in which example embodiments are shown. Whenever possible, the same reference numerals are used throughout the drawings to refer to the same or like parts. However, this invention may be embodied in many different forms and should not be construed as limited to the embodiments set forth herein. These example embodiments are provided so that this disclosure will be both thorough and complete, and will fully convey the scope of the invention to those skilled in the art.

Various signals are discussed below. It is to be appreciated that the signals can be analog signals, digital signals or data values stored in a memory location, such as a register. Various circuits and portions of circuits are discussed below. It is to be appreciated that the circuits and portions of circuits can be implemented via discrete electrical components, integrated circuits, and/or through the execution of program instructions by a processor.

A challenge with known gas turbine coordinated air-fuel controllers is that coordination of the inputs to the air supply and fuel supply controllers does not necessarily coordinate their outputs, air and fuel demand, respectively. One reason for this is that the relationship between turbine speed error and turbine exhaust temperature error is not intuitive, making the cross channel controller difficult to design and tune. Another reason is that constraints within the fuel supply controller may make the turbine speed error a poor indicator of impending fuel supply changes.

Known cross channel controllers operate in "control error space," linking the speed error and the exhaust temperature error. However, a correct relationship between speed error and exhaust temperature error is difficult to determine. A better approach is to have the cross channel controller operate in "demand space," which is located after respective control transfer functions operating on the error signals in the control channels. The cross channel controller in demand space can utilize a direct relationship between air and fuel, such as an air versus fuel model, to coordinate air and fuel supply. A correct relationship between air and fuel can be easier to determine than a correct relationship between speed error and exhaust temperature error. Therefore, a coordinated air-fuel controller having a cross channel controller located in demand space can be easier to design and tune than known cross channel controllers. Having the cross channel controller in demand space also enables it to reflect constraints within the fuel supply controller.

FIG. 1 is a schematic diagram of a gas turbine 11 and a coordinated air-fuel controller 13 for the gas turbine that includes a cross channel controller 15 operating in a demand space portion of the controller 13. The gas turbine 11 has an associated speed sensor 17 that senses a rotational speed of the gas turbine (i.e., the actual rotational speed or a representative speed). The speed sensor 17 provides a turbine speed feedback signal 21 as an input to the controller 13. The gas turbine 11 also has a temperature sensor 23 that senses the temperature of the exhaust gas of the gas turbine. The temperature sensor 23 provides an exhaust temperature feedback signal 25 as an input to the controller.

The gas turbine 11 drives an electric generator 27. One or more sensors 29 can provide input signals to the controller 13 related to an electrical load on the generator. The sensors 29 can provide load signals 31 such as electrical level, for example.

The coordinated air-fuel controller 13 will now be discussed in detail. The coordinated air-fuel controller 13 can include sub-controllers, such as the cross channel controller 15, a fuel controller 33 and a combustion air controller 35. The controller 13 can be an electronic controller and can include one or more processors. For example, the controller 13 can include one or more of a microprocessor, a microcontroller, a digital signal processor (DSP), an application specific integrated circuit (ASIC), a field-programmable gate array (FPGA), discrete logic circuitry, or the like. The controller 13 can further include memory and may store program instructions that cause the controller to provide the functionality ascribed to it herein. The memory may include one or more volatile, non-volatile, magnetic, optical, or electrical media, such as read-only memory (ROM), random access memory (RAM), electrically-erasable programmable ROM (EEPROM), flash memory, or the like. The controller 13 can further include one or more analog-to-digital (A/D) converters for processing various analog inputs to the controller.

The controller 13 has a rotational speed error calculator 37 and a speed reference 39. The rotational speed error calculator 37 determines a rotational speed error based on the signal from the speed sensor 17 and the speed reference 39. For example, the rotational speed error calculator 37 compares the turbine speed feedback signal 21 and the speed reference 39 and outputs a rotational speed error signal 41. In an embodiment, the rotational speed error calculator 37 calculates the difference between the turbine speed feedback signal 21 and the speed reference 39. The speed reference 39 can change over time in response to changed operating conditions.

Optionally, to improve load regulation, a load signal 31 is provided to the rotational speed error calculator 37 in addition to the turbine speed feedback signal 21. The controller 13 can include a droop filter 43 along the load signal 31 between the sensor 29 and rotational speed error calculator 37. The droop filter 43 converts the load signal 31 to a speed signal for use by the rotational speed error calculator 37. The conversion by the droop filter 43 is based on a grid frequency of an electrical grid to which the generator 27 is connected.

The rotational speed error signal 41 is provided to the fuel controller 33. An optional dead band filter 45 can be located between the rotational speed error calculator 37 and the fuel controller 33, to prevent unwanted operation of a fuel control actuator 47 based on small errors in speed. The fuel controller 33 provides a fuel control output signal 49 to the fuel control actuator 47 to control operations of the fuel control actuator. The fuel control actuator 47 responds to the fuel control output signal 49 to control the amount of fuel provided to the combustion chamber of the gas turbine. The fuel control actuator 47 can control, for example, a fuel stroke 73 of one or more fuel valves, based on a fuel stroke reference (FSR) signal from the fuel controller 33. The fuel controller 33 controls the amount of fuel provided to the combustion area by controlling the operations of the fuel control actuator 47.

The fuel controller 33 receives the rotational speed error signal 41 and processes the error signal to generate the fuel control output signal 49. In an embodiment, the fuel controller 33 processes the rotational speed error signal 41 using a transfer function $K_1(s)$ 51. For example, the fuel controller 33 can implement a proportional-integral (PI) control scheme to generate the fuel control output signal 49 from the rotational speed error signal 41. In the PI control scheme, the transfer function $K_1(s)$ 51 would include a proportional term having a proportional gain and an integral term having gain. Alternatively, the fuel controller 33 can implement a proportional-integral-derivative (PID) control scheme, or implement other control schemes.

The controller 13 has an exhaust temperature error calculator 53 and a temperature reference 55. The exhaust temperature error calculator 53 determines an exhaust temperature error based on the signal from the temperature sensor 23 and the temperature reference 55. For example, the exhaust temperature error calculator 53 compares the exhaust temperature feedback signal 25 and the temperature reference 55 and outputs an exhaust temperature error signal 57. In an embodiment, the exhaust temperature error calculator 53 calculates the difference between the exhaust temperature feedback signal 25 and the temperature reference 55. The temperature reference 55 changes over time in response to changed operating conditions, such as a change in the amount of fuel that supplied to the combustion area of the gas turbine.

The exhaust temperature error signal 57 is provided to the combustion air controller 35. The combustion air controller 35 provides a combustion air control output signal 59 to a combustion air control actuator 61 to control operations of the combustion air control actuator. The combustion air control actuator 61 responds to the combustion air control output signal 59 to control the amount of air provided to the combustion chamber of the gas turbine. The combustion air control actuator 61 can control, for example, the position (e.g., angle) of inlet guide vanes of the gas turbine. The combustion air controller 35 controls the amount of air provided to the combustion area by controlling the operations of the combustion air control actuator 61.

The combustion air controller 35 receives the exhaust temperature error signal 57 and processes the error signal to generate a preliminary combustion air control signal 63. In an embodiment, the combustion air controller 35 processes the exhaust temperature error signal 57 using a transfer function $K_2(s)$ 65. For example, the combustion air controller 35 can implement a PI control scheme to generate the preliminary combustion air control signal 63 from the exhaust temperature error signal 57. Alternatively, the combustion air controller 35 can implement a PID control scheme or implement other control schemes.

The cross channel controller 15, which operates in a demand space portion of the coordinated air-fuel controller 13, communicates with both of the fuel controller 33 and the combustion air controller 35. The cross channel controller 15 receives the fuel control output signal 49 from the fuel controller 33 and calculates a combustion air control modification signal 67 based on the fuel control output signal. The cross channel controller 15 provides the combustion air control modification signal 67 to the combustion air controller 35.

The combustion air controller 35 receives the combustion air control modification signal 67 from the cross channel controller 15. The combustion air controller 35 determines the combustion air control output signal 59 based on both of the preliminary combustion air control signal 63 and the combustion air control modification signal 67. For example, the combustion air controller 35 can include a summing circuit 69 for combining the preliminary combustion air control signal 63 and the combustion air control modification signal 67 to determine the combustion air control output signal 59. The preliminary combustion air control signal 63 and the combustion air control modification signal 67 can be added together by the summing circuit 69, and the output of the summer is the combustion air control output signal 59. Other methods besides a simple sum may be used to combine the preliminary combustion air control signal 63 and the combustion air control modification signal 67. For example, the combination may be done via an algorithm that weights one input over the other, depending on the circumstance.

The combustion air control modification signal 67 serves to coordinate operations of the fuel controller 33 and the combustion air controller 35. Such coordination may reduce the likelihood that various adverse conditions of the gas turbine will occur. For example, such coordination may reduce the likelihood of lean blowout, exhaust over temperature and compressor surge.

Figure 2:
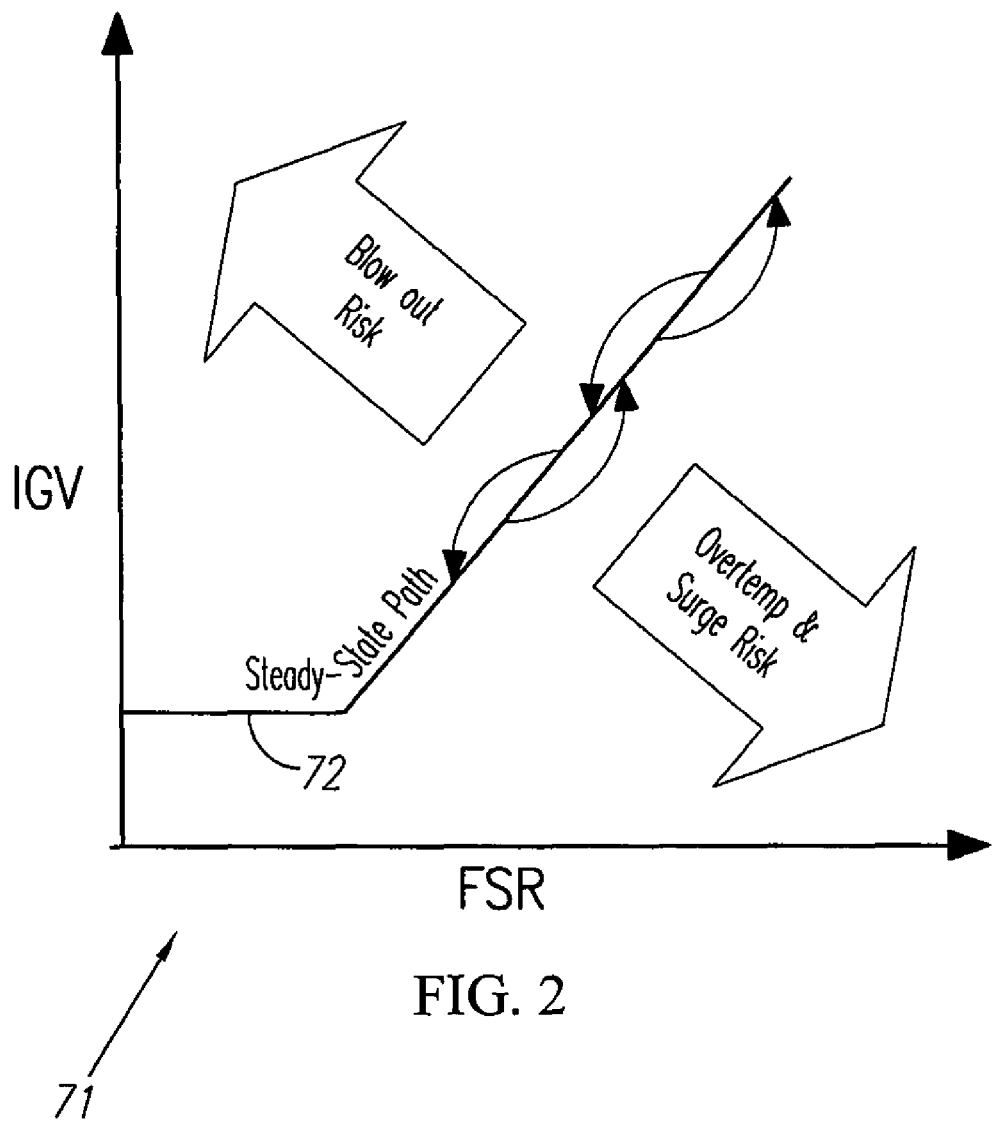
FIG. 2 is a graph showing inlet guide vane position versus fuel stroke reference.

The cross channel controller 15 will now be discussed in detail. The cross channel controller 15 includes an air versus fuel model. The cross channel controller 15 uses the air versus fuel model to calculate the combustion air control modification signal 67 from the fuel control output signal 49. For example, as shown in FIG. 2, the air versus fuel model 71 can relate inlet guide vane position (IGV) to fuel stroke reference (FSR). Alternatively, the air versus fuel model can directly relate airflow to fuel flow. For a given fuel control output signal 49, the cross channel controller 15 determines and outputs a corresponding combustion air control modification signal 67 using the air versus fuel model. It is to be appreciated that the air versus fuel model can be implemented via an algorithm using a mathematical equation, via a lookup table, or via other known modeling techniques.

As shown in FIG. 2, the air versus fuel model 71 can provide a steady-state correspondence between FSR and IGV. Therefore, the air versus fuel model 71 is a steady-state model. The cross channel controller 15 will output the combustion air control modification signal 67 to maintain the operation of the gas turbine 11 generally along the steady-state path 72 shown. Deviations from the steady state path (for example too high or too low an IGV value for a given FSR), shown schematically by bent arrows in FIG. 2, can result in the occurrence of adverse conditions such as lean blow out, exhaust over-temperature and compressor surge.

In FIG. 2, the steady-state path 72 is piecewise linear. The steady-state path 72 has a horizontal portion in which IGV is constant over a low range of FSR. After the horizontal portion, the steady-state path 72 has a constant positive slope as FSR increases. It is to be appreciated that the steady-state path can have curved portions or a combination of straight and curved portions.

The air versus fuel model 71 shown in FIG. 2 is a steady-model. It is to be appreciated that other models could be used by the cross channel controller 15 in determining the combustion air control modification signal 67, such as a transient model or a combination steady-state and transient model.

In the embodiment of FIG. 1, no cross channel controller is shown operating in control error space. However, an additional cross channel controller could be provided in control error space if desired.

The embodiment of FIG. 1 includes separate fuel and air control loops and a cross-channel controller 15. In a further embodiment, the separate fuel and air control loops and cross-channel controller are replaced by a multi-input, multi-output controller implementing a control algorithm that provides the functionality described herein.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A control system for a gas turbine, including:
a fuel control actuator;
a combustion air control actuator;
a speed sensor that senses a rotational speed of the gas turbine;
a temperature sensor that senses exhaust temperature of the gas turbine; and
a coordinated air-fuel controller that controls operations of the fuel control actuator and the combustion air control actuator, wherein the coordinated air-fuel controller receives a first input signal from the speed sensor and a second input signal from the temperature sensor, and wherein the coordinated air-fuel controller further includes:
a rotational speed error calculator that determines a rotational speed error based on the first input signal from the speed sensor and a speed reference;
an exhaust temperature error calculator that determines an exhaust temperature error based on the second input signal from the temperature sensor and a temperature reference;
a fuel controller that provides a fuel control output signal to the fuel control actuator to control operations of the fuel control actuator, wherein the fuel controller determines the fuel control output signal based on the rotational speed error;
a combustion air controller that provides a combustion air control output signal to the combustion air control actuator to control operations of the combustion air control actuator; and
a cross channel controller in communication with the fuel controller and the combustion air controller, wherein the cross channel controller provides a combustion air control modification signal to the combustion air controller, and wherein the cross channel controller determines the combustion air control modification signal from the fuel control output signal using an air versus fuel model, and wherein the combustion air controller determines a preliminary combustion air control signal based on the exhaust temperature error, and further determines the combustion air control output signal based on both of the preliminary combustion air control signal and the combustion air control modification signal.

2. The control system of claim 1, wherein the fuel controller processes the rotational speed error using a fuel control transfer function that includes a proportional gain and an integral gain, to determine the fuel control output signal which is provided to both of the fuel control actuator and the cross channel controller, and wherein the combustion air controller processes the exhaust temperature error using a combustion air control transfer function, to determine the preliminary combustion air control signal.

3. The control system of claim 2, wherein the cross channel controller operates in a demand space portion of the coordinated air-fuel controller.

4. The control system of claim 1, wherein the combustion air control actuator controls a position of an inlet guide vane.

5. The control system of claim 4, wherein the fuel control actuator controls a fuel stroke, and further wherein the air versus fuel model provides a relationship between a fuel stroke reference and the position of the inlet guide vane.

6. A method of controlling air supply and fuel supply in a gas turbine, including the steps of:

determining a rotational speed of the gas turbine;

generating a rotational speed error by comparing the rotational speed of the gas turbine to a speed reference;

generating a fuel control output signal corresponding to the rotational speed error;

providing the fuel control output signal to a fuel control actuator;

adjusting, by the fuel control actuator, a fuel flow based on the fuel control output signal;

providing a cross channel controller including an air versus fuel model;

generating, by the cross channel controller and from the fuel control output signal, a combustion air control modification signal using the air versus fuel model;

determining an exhaust temperature of exhaust gas of the gas turbine;

generating an exhaust temperature error by comparing the exhaust temperature to a temperature reference;

generating a preliminary combustion air control signal corresponding to the exhaust temperature error;

combining the preliminary combustion air control signal and the combustion air control modification signal to generate a combustion air control output signal;

providing the combustion air control output signal to a combustion air control actuator; and adjusting, by the combustion air control actuator, an amount of combustion air based on the combustion air control output signal.

7. The method of claim 6, wherein the step of generating a fuel control output signal includes processing the rotational speed error using a fuel control transfer function that includes a proportional gain and an integral gain; and wherein the step of generating a preliminary combustion air control signal includes processing the exhaust temperature error using a combustion air control transfer function.

8. The method of claim 7, further including the step of providing a coordinated air-fuel controller that includes both of a fuel controller and a combustion air controller, wherein the cross channel controller operates in a demand space portion of the coordinated air-fuel controller.

9. The method of claim 6, wherein the step of adjusting, by the combustion air control actuator, an amount of combustion air includes adjusting a position of an inlet guide vane.

10. The method of claim 9, wherein the step of adjusting, by the fuel control actuator, a fuel flow includes adjusting a fuel stroke, and further wherein the air versus fuel model provides a relationship between a fuel stroke reference and the position of the inlet guide vane.

\* \* \* \* \*